(12) United States Patent
Nevin

(10) Patent No.: US 8,900,360 B2
(45) Date of Patent: Dec. 2, 2014

(54) ASPHALT COMPOSITIONS WITH RESINOUS ADDITION DERIVED FROM ANIMAL WASTE

(75) Inventor: James E. Nevin, Lakeworth, FL (US)

(73) Assignee: Imperial Commodities Corp., New York, NY (US)

( * ) Notice: Subject to any disclaimer, the term of this patent is extended or adjusted under 35 U.S.C. 154(b) by 196 days.

(21) Appl. No.: 13/482,265

(22) Filed: May 29, 2012

(65) Prior Publication Data
US 2013/0319289 A1  Dec. 5, 2013

(51) Int. Cl.
C08L 95/00 (2006.01)
C10G 1/00 (2006.01)
C11B 1/00 (2006.01)

(52) U.S. Cl.
USPC ............ 106/284.4; 106/281.1; 585/240; 554/8

(58) Field of Classification Search
USPC ........... 106/281.1, 284.4, 504; 524/59, 64; 585/240; 424/543; 554/8; 210/770; 110/221
See application file for complete search history.

(56) References Cited

U.S. PATENT DOCUMENTS

| 4,177,079 A * | 12/1979 | Espenscheid ............ 106/274 |
| 6,844,420 B1 * | 1/2005 | Freel et al. .............. 530/200 |
| 7,105,088 B2 * | 9/2006 | Schien et al. ............ 210/188 |
| 7,597,812 B2 * | 10/2009 | Schien et al. ............ 210/770 |
| 7,985,345 B2 * | 7/2011 | Lux et al. ................ 210/770 |
| 2003/0212168 A1 * | 11/2003 | White et al. ............. 524/59 |
| 2009/0031616 A1 * | 2/2009 | Agblevor ................. 44/307 |
| 2010/0275817 A1 * | 11/2010 | Williams et al. .......... 106/671 |
| 2011/0257307 A1 * | 10/2011 | Lux et al. ................ 524/62 |
| 2011/0294927 A1 * | 12/2011 | Williams et al. .......... 524/59 |
| 2012/0272700 A1 * | 11/2012 | Nevin ..................... 71/12 |
| 2014/0083331 A1 * | 3/2014 | Fini ....................... 106/284.4 |

FOREIGN PATENT DOCUMENTS

WO   WO 2011/071909 A1 * 6/2011

* cited by examiner

Primary Examiner — Helene Klemanski
(74) Attorney, Agent, or Firm — Renner Kenner Greive Bobak Taylor & Weber

(57) ABSTRACT

A bio-resource resin for use as a replacement for a portion of asphalt in asphalt compositions includes a bio-oil derived from animal waste and including hydrocarbons; and a compatibilizing agent. The bio-oil is derived from animal waste by subjecting the animal waste to a conversion process selected from a hydrothermal conversion process and a thermochemical conversion process. This bio-resource resin can be employed as a substitute for a portion of asphalt in common asphalt compositions, and the compatibilizing agent improves the chemical compatibility between the bio-oil and the asphalt.

20 Claims, 1 Drawing Sheet

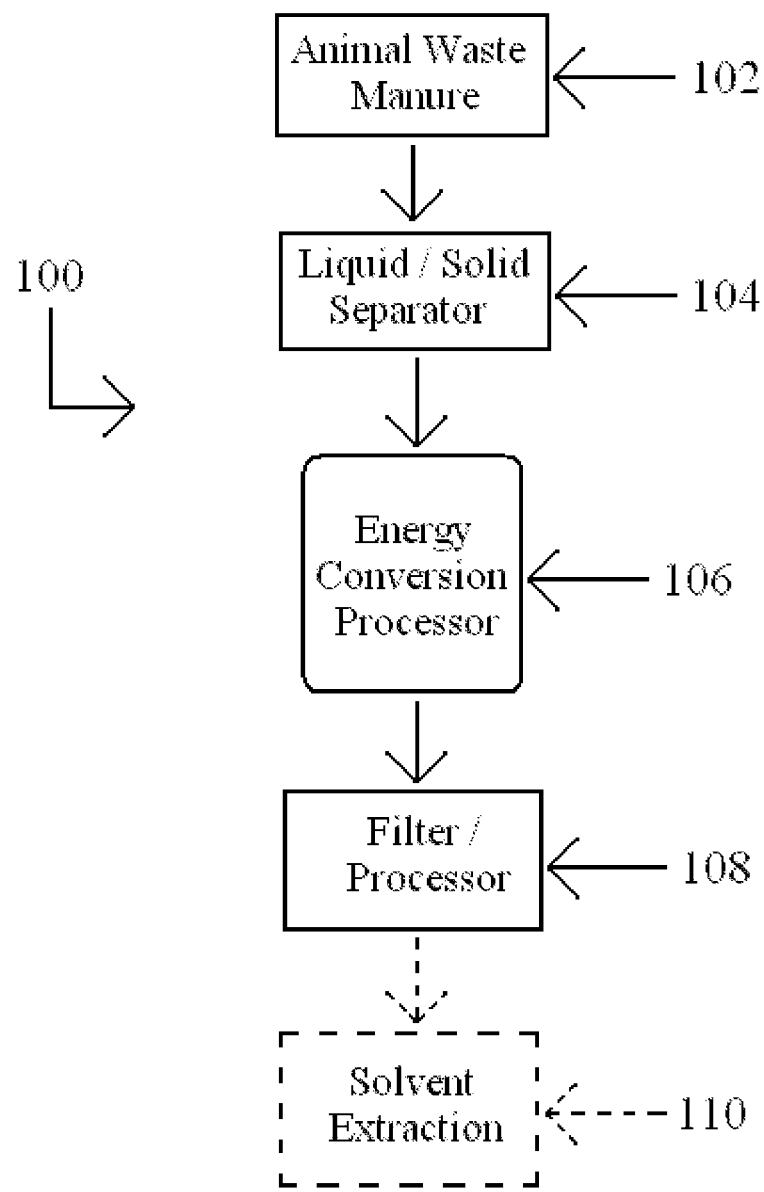

ASPHALT COMPOSITIONS WITH RESINOUS ADDITION DERIVED FROM ANIMAL WASTE

FIELD OF THE INVENTION

The present invention relates to improvements in asphalt compositions. More particularly, the present invention provides asphalt compositions that are comprised in part of a biologically derived resin sourced from animal waste streams, in particular embodiments, from manure. In some embodiments, the present invention relates to asphalt compositions including asphalt, a biologically derived resin sourced from animal waste streams, and at least one compatibilizing agent for improving the compatibility between the biologically derived resin and the asphalt. In other embodiments, the present invention relates to a stand-alone product including a biologically derived resin sourced from animal waste streams, and at least one compatibilizing agent.

BACKGROUND OF THE INVENTION

The disposal of animal waste has become a very important issue in intensive animal farming. The excreta of various intensively farmed animals, though rich in nutrients, is potentially polluting to the environment. For example, nitrogen and phosphorous compounds from cow, horse and swine manure can contaminate surface water and can even leach into groundwater. Ammonia and methane gas given off from stored manure or slurry can cause respiratory distress to people and animals in the local vicinity. As a result, there is a drive to put animal waste to beneficial uses, to reduce the amount disposed of and/or stored and thereby reduce some of the negative impacts intensive farming can have on the environment. Finding viable uses for animal waste, particularly uses that might consume the vast quantities of manure produced on moderate and large farms, would reduce the need for other disposal methods and would eliminate such waste as a source of pollution. Animal waste is also a very readily renewable resource, so supplies are beneficially fairly consistent and predictable.

In present research conducted by entities such as Innoventor, Inc. (St. Louis, Mo.), animal waste (e.g., manure) has been converted to a resinous hydrocarbon substance through energy conversion processes subjecting the animal waste to high pressures or high temperatures or both, typically under anaerobic conditions. It is believed that, under the application of pressure and/or temperature, larger hydrocarbon chains present in the animal waste break down into smaller chain hydrocarbon molecules. Much of the liquid content is driven off, and the result is a resinous product that is hereinafter referred to as "bio-oil." The general processes for the creation of this bio-oil is found disclosed in U.S. Pat. Nos. 7,105,088, 7,597,812, and 7,985,345. Processing parameters and equipment are disclosed in Ocfemia, K. S., Zhang, Y. H., and Funk, T. (2006), Hydrothermal processing of Swine Manure into Oil Using a Continuous Reactor System: Development and Testing, Transactions of ASAE 49(2), 533-541 and Ocfemia, K. S., Zhang, Y. H., and Funk, T. (2006), Hydrothermal Processing of Swine Manure to Oil Using a Continuous Reactor System-Effects of Operating Parameters on Oil Yield and Quality, Transactions of ASAE 49(6), 1897-1904, both of which are incorporated herein by reference in their entirety. Currently, acceptable bio-oil is produced by Advanced BioRefinery Inc. (Ottawa, Canada).

Certain entities are currently researching the use of this bio-oil in asphalt binders. An asphalt mixture typically includes an asphalt binder mixture comprised mainly of petroleum-based asphalt binder, and aggregate, the asphalt binder mixture serving to bind the aggregate together. The resinous, tarry look and feel of the bio-oil sourced from animal waste suggests that it might serve as a replacement or as a substitute for asphalt, and, indeed, Innoventor, Inc., in its U.S. Pat. No. 7,985,345 broadly mentions the use of bio-oil as a potential substitute for all or a portion of petroleum-based asphalt binder in an asphalt mixture. However, research by the present inventor shows that bio-oil does not durably blend with petroleum-based asphalt binders, calling into question the broad statements made in the referenced patent. Notably, the cited patent is silent on the incompatibility of bio-oil with asphalt, and does not provide any working examples. It appears that the inventors of that patent simply saw that the bio-oil looked like asphalt, and therefore broadly stated that bio-oil could serve as a substitute, without any real data supporting this contention. Indeed, the cited patent only discloses the partial or full replacement of asphalt binder by bio-oil in very broad and general terms, and fails to provide any working example. The cited patent very broadly discloses an asphalt mixture of petroleum-based asphalt binder, bio-oil and aggregate, but upon testing, the bio-oil separates from the asphalt binder, thus failing to serve as a ready substitute for all or a partial amount of the asphalt. This failure is shown herein, and the present invention provides for better compatibility between asphalt and the bio-oil.

The use of bio-oil as a partial substitute for asphalt components is still of great interest, because, if successfully implemented, it would put animal waste to beneficial use. Thus, there is a need in the art to solve the problem encountered in attempting to incorporate bio-oil in an asphalt component. Particularly, there is a need in the art to prevent the separation of bio-oil from asphalt components so that the bio-oil may be successfully employed and may find commercial use.

SUMMARY OF THE INVENTION

In a first embodiment, the present invention provides a bio-resource resin for use as a replacement for a portion of asphalt in asphalt compositions, the bio-resource resin comprising: a bio-oil derived from animal waste and including hydrocarbons; and a compatibilizing agent.

A second embodiment provides a bio-resource resin as in the first embodiment, wherein the bio-oil is derived from animal waste by subjecting the animal waste to a conversion process selected from a hydrothermal conversion process and a thermochemical conversion process.

A third embodiment provides a bio-resource resin as in the first or second embodiment, wherein the animal waste is processed at a temperature of from 100 to 400° C.

A fourth embodiment provides a bio-resource resin as in any of the first through third embodiments, wherein the animal waste is processed at a pressure of greater than 200 psi.

A fifth embodiment provides a bio-resource resin as in any of the first through fourth embodiments, wherein the animal waste is processed in the absence of oxygen.

A sixth embodiment provides a bio-resource resin as in any of the first through fourth embodiments, wherein the animal waste is processed at a pressure for from 1600 psi to 1800 psi and a temperature of from 250 to 350° C.

A seventh embodiment provides a bio-resource resin as in any of the first through fourth embodiments, wherein, prior to being subjected to a conversion process, the animal waste is processed to form a slurry having less than 30% solids content.

A eighth embodiment provides a bio-resource resin as in any of the first through fourth embodiments, wherein the compatibilizing agent is selected from hydrocarbon molecules containing amine functionalities, hydrocarbon molecules containing amide functionalities, hydrocarbon molecules containing amidoamine hybrid functionalities, hydrocarbon molecules containing hydroxyl functionalities, hydrocarbon molecules containing ester functionalities, hydrocarbon molecules containing carboxylic acid functionalities, copolymers of ethylene and vinyl acetate, maleated soybean oil, glycerin and mixtures of the forgoing.

A ninth embodiment provides a bio-resource resin as in any of the first through fourth embodiments, wherein the bio-resource resin includes from 0.1 to 50 parts compatibilizing agent per 100 parts bio-oil.

A tenth embodiment provides a bio-resource resin as in any of the first through fourth embodiments, wherein the bio-resource resin includes from 1 to 10 parts compatibilizing agent per 100 parts asphalt.

An eleventh embodiment provides an asphalt composition comprising: asphalt; bio-oil derived from animal waste and including hydrocarbons; and a compatibilizing agent improving the chemical compatibility between the bio-oil and the asphalt.

A twelfth embodiment provides an asphalt composition as in the eleventh embodiment, wherein the bio-oil is derived from animal waste by subjecting the animal waste to a conversion process selected from a hydrothermal conversion process and a thermochemical conversion process.

A thirteenth embodiment provides an asphalt composition as in the eleventh or twelfth embodiment, wherein the animal waste is processed at a temperature of from 100 to 400° C.

A fourteenth embodiment provides an asphalt composition as in any of the eleventh through thirteenth embodiments, wherein the animal waste is processed at a pressure of greater than 200 psi.

A fifteenth embodiment provides a bio-resource resin as in the eleventh or fourteenth embodiment, wherein the animal waste is processed in the absence of oxygen.

A sixteenth embodiment provides a bio-resource resin as in the eleventh or fifteenth embodiments, wherein the compatibilizing agent is selected from hydrocarbon molecules containing amine functionalities, hydrocarbon molecules containing amide functionalities, hydrocarbon molecules containing amidoamine hybrid functionalities, hydrocarbon molecules containing hydroxyl functionalities, hydrocarbon molecules containing ester functionalities, hydrocarbon molecules containing carboxylic acid functionalities, copolymers of ethylene and vinyl acetate, maleated soybean oil, glycerin and mixtures of the forgoing.

A seventeenth embodiment provides a bio-resource resin as in the eleventh or sixteenth embodiments, wherein the asphalt composition includes from 20 to 95 percent by weight (wt %) asphalt, from 4.9 to 40 wt % bio-oil and from 0.1 to 40 wt % compatibilizing agents.

An eighteenth embodiment provides a bio-resource resin as in the eleventh or seventeenth embodiments, wherein the asphalt composition includes at least 5 parts bio-oil per 100 parts asphalt and at least 0.1 parts compatibilizing agents per 100 parts asphalt.

A nineteenth embodiment provides a bio-resource resin as in the eleventh or eighteenth embodiments, wherein the asphalt composition further includes 0.5 parts SBS block copolymer per 100 parts asphalt.

A twentieth embodiment provides a bio-resource resin as in the eleventh or nineteenth embodiments, further including at least one additive selected from fibers, fiber-dispersing surfactants, limestone, clay, clay-activating surfactants, diatomaceous earth, talc, and mica.

BRIEF DESCRIPTION OF THE DRAWINGS

FIG. 1 is a flow chart of a general prior art process for the creation of bio-oil, which is used in accordance with this invention to create a bio-resource resin and asphalt compositions.

DETAILED DESCRIPTION OF ILLUSTRATIVE EMBODIMENTS

In accordance with the present invention, beneficial use is made of animal waste that has been converted into bio-oil. More particularly, the present invention provides asphalt compositions that include asphalt, bio-oil and at least one compatibilizing agent serving to overcome the incompatability of bio-oil with asphalt. In other embodiments, this invention provides mixtures of bio-oil and at least one compatibilizing agent as a stand-alone product useful for addition to asphalt compositions. The combination of the bio-oil with the at least one compatibilizing agent is herein termed a "bio-resource resin," the name indicating that it is a resinous material that is derived from a biological source, and also distinguishing this compatibilize agent-containing product from mere bio-oil. This bio-resource resin may be employed as a partial substitute for asphalt in virtually any common asphalt application. These include, without limitation asphalt compositions such as asphalt cement (asphalt binder and aggregate), asphalt inter-ply coatings (asphalt, hydrocarbon solvent, surfactant, attapulgite clay and finely ground limestone and cellulose fibers), asphalt adhesives (asphalt, fillers and polymers), asphalt roofing cements (asphalt, surfactant, attapulgite clay, finely ground limestone and cellulose fibers), asphalt crack fillers (asphalt, fillers and polymers).

The bio-oil employed to create the bio-resource resin is derived from animal waste, with the understanding that "animal waste" as used herein includes not only the typically understood animal excreta but also the bodies of the animals themselves. That is, "animal waste" herein may include dead animal bodies and portions thereof. In accordance with this invention, the bio-oil may be produced from animal excreta, from animal bodies or both. Because animal excreta can be employed without destruction of the host animal and further because the disposal of excreta can cause significant environmental impact, it is preferable to use only animal excreta and other waste materials from the host animals particularly hair and other such fugitive substances often found in the collection of manure. However, animal farming and meat production can result in a number of dead animal bodies (whole or body parts), and this invention can provide a way in which to beneficially dispose of such bodies, converting them to a bio-oil and including compatibilizing agents to provide a useful bio-resource resin.

Thus, in particular embodiments, the animal waste is animal excreta, particularly manure, which should be understood as being the combined feces, urine and added products such as water, wasted feed, hair and bedding for the animals, which added products are typically very difficult to separate from the urine/feces excreta. The manure may come from any animal source, even human. Pig, chicken, cow, lamb, goat, and horse manure are likely to be the best source for producing the bio-oil because a great number of these animals are often gathered together in one place for animal farming, thus yielding a significant amount of manure in one place for easier collection. Pig manure is of particular interest because pigs tend to produce a large amount of manure, as compared to other animals.

The general production of the bio-oil is described with reference to FIG. 1, the production process being identified by the numeral 100. Raw animal waste, typically manure, is collected, as at 102, and fed to a solid/liquid separator, as at 104. The raw waste will typically have a high liquid content, often in the range of 80% or higher, and the separator is used to bring the waste to a solids content that is more suitable to being processes in an energy conversion processor, as at 106. The solid/liquid separator is employed to feed the waste to the energy conversion processor in an acceptable form, with liquid and slurry forms typically preferred because they are easier to convey and process. Manure usually has the characteristics of a liquid when it has 15% solids or less, but might be found to have the characteristics of a solid at 20% solids or greater. Dry manure can be broken up and mixed with water or other extenders and/or fillers to create the desired slurry and percent solids content for the process herein. Thus, it should also be appreciated that the waste could be obtained already having a high solids content or could be separated to a high solids content and stored, thereafter being processed with water or other liquids into a slurry or semi-slurry form suitable for processing in the energy conversion processor.

In this invention, the bio-oil is produced by thermochemical (i.e., pyrolysis) reaction or hydrothermal conversion process whereby a combination of high temperature and pressure in the absence of oxygen is believed to produce smaller hydrocarbon molecules from the larger ones found in animal waste. In some embodiments, the animal waste is processed in the form of slurry having a solids content of less than 30%, in other embodiments, less than 25%, in other embodiments, less than 20%, in other embodiments, less that 15%, in yet other embodiments, less than 10%, and in other embodiments, 5% or less. In some embodiments, the collected liquid slurry waste is processed by first pumping the matter through a particle size reduction apparatus so that it can more readily be pumped through the reactor tubing or piping of the energy conversion processor and other chosen processing apparatus.

In one possible route for producing the bio-oil of the present invention, the waste contained within the confines of the barn pit is pumped into a holding tank where it is filtered and ground (particle size reduction) before being concentrated to a carefully designed solids percentage prior to being charged to an energy conversion process unit such as a hydrothermal converter. Conversion in this case, involves the use of pumps and heat exchangers to increase the pressure and temperature of the waste stream to the point where the molecular structure of the waste hydrocarbon compounds begins to crack or split apart forming smaller structures. The magnitude of the temperature and pressure along with the exposure time contribute to the degree of molecular cracking and hence the composition of the final product.

In some embodiments a 200 mesh screen is used to better homogenize the solids content. The animal waste is processed in the absence of oxygen, at a temperature of from 100 to 400° C., and the pressure is maintained sufficiently high to ensure that the slurry, which is comprised of a significant amount of water, does not boil.

In one embodiment, the energy conversion processor is a coiled length of jacketed tubing, the contents of which are controlled by temperature sensors and temperature controllers. The temperature controller controls the temperature of a heated fluid or heated gas flowing to the jacket tubing to heat the waste flowing therethrough.

In some embodiments of this process, the energy conversion processor is pressurized to a minimum pressure of 200 psi (pounds per square inch), in other embodiments, a minimum pressure of 400 psi, in other embodiments, a minimum pressure of about 800 psi, in other embodiments a minimum pressure of 1200 psi, in yet other embodiments a minimum pressure of 1600 psi, and in yet other embodiments a minimum pressure of 1800 psi. In some embodiments, at any of the aforementioned pressures, the energy conversion processor is heated to a temperature between 100 and 400° C., in other embodiments, from 150 to 375° C., and in other embodiment, from 200 to 350° C. In particular embodiments the temperature is maintained near 300° C.

In some embodiments, the processing is carried out in the absence of free oxygen, to prevent the oxidation of chemical compounds. In particular processes, the energy conversion processor is pressurized to a pressure of from 1600 psi to 1800 psi and is heated to a temperature between 250 and 350° C., in the absence of free oxygen, to prevent the oxidation of chemical compounds. In the process, after about 10 to 100 minutes at the above processing conditions, it is believed that the high molecular weight compounds of the animal waste are cleaved, thereby forming smaller hydrocarbon molecules which are more useful in the present invention.

When the heating and/or pressurization phase is completed, the product is let down to atmospheric pressure and allowed to cool prior to being separated into predominantly oil and water streams, as at filter/processor 108. The oil stream is further dried, after which point it would be considered bio-oil. The bio-oil is dried to facilitate storage and transportation, particularly with regard to volume and weight. The bio-oil is preferably dried to have a minimum solids content of 80%, in other embodiments, 85%, in other embodiments, 90%, and in yet other embodiments, from 95 to 100%. At 25° C. the dried product is a solid resinous substance similar in consistency to asphalt and can be made liquid by heating to higher temperatures, typically of about 60° C. and higher. The water stream removed during this filtering and drying may be pumped to a containment facility where it is processed before being used in irrigation or nutrient supply applications.

The product resulting from this process is the "bio-oil" used in this invention. Processing parameters and equipment are disclosed in Ocfemia, K. S., Zhang, Y. H., and Funk, T. (2006), Hydrothermal processing of Swine Manure into Oil Using a Continuous Reactor System: Development and Testing, Transactions of ASAE 49(2), 533-541 and Ocfemia, K. S., Zhang, Y. H., and Funk, T. (2006), Hydrothermal Processing of Swine Manure to Oil Using a Continuous Reactor System-Effects of Operating Parameters on Oil Yield and Quality, Transactions of ASAE 49(6), 1897-1904, both of which are incorporated herein by reference in their entirety. Currently, acceptable bio-oil is produced at least by Advanced BioRefinery Inc. (Ottawa, Canada) and Innoventor Inc. (St. Louis, Mo., USA). Regarding Innoventor's work, see U.S. Pat. Nos. 7,105,088, 7,597,812 and 7,985,345, incorporated herein by reference in their entirety. Indeed, the present invention employs the bio-oil taught by these various sources and shows how to compatibilize this known bio-oil with asphalt by including at least one compatibilizing agent in asphalt compositions including bio-oil. The at least one compatibilizing agent may be added to the asphalt composition as a separate addition or it may be added first to the bio-oil. The combination of the bio-oil with the at least one compatibilizing agent is herein termed a bio-resource resin, as already noted above, and can be provided as a separate stand-alone product.

A still further manipulation of the bio-oil may be necessary in applications where specific compositional fractions need be separated. In such cases, the resin is exposed to choice solvents intended for the extraction of the desired fraction. In this manner, for example, acetone can be used to remove approximately 50% by weight of the more polar organic components of the bio-oil, and this polar organic portion may find more specialized use in specific applications such as asphalt coatings and adhesives and the like where the broad spectrum of chemical found in manure can be problematic in terms of the intended performance of the final product. The more lipophilic fraction left behind would be available for other uses, such as asphalt binders and cements where moisture resistance is more important.

Regardless of the exact method by which the waste materials are converted and regardless of the initial source or composition of the waste materials that are to be converted, the present invention discloses methods and compositions permitting the bio-oil to be effectively incorporated into asphalt compositions. Notably, the bio-oil emanates from a hydro-systemic life form (i.e., from animals and their waste) and is therefore of a polar chemical nature and will have some affinity for water. Because of this polar chemical affinity, it is very difficult to use the bio-oil output of these processes as additives or in uses where strict water resistance is a specific desired or necessary property. It is certain that the bio-oil output stream from the energy conversion processors currently known are not being broadly used in any sophisticated compositions (such as asphalt binders, cements, coatings and adhesives) largely due to the fact that the chemical composition thereof is not readily adaptable for use in these systems without creating a significant reduction in performance at reasonably acceptable usage levels. Particularly, the bio-oil is observed to separate out of mixtures with asphalt compositions. This notably calls into question the broad claims by prior art practitioners that bio-oil can be used as a substitute for asphalt.

The present inventor has found that, when bio-oil is added directly to mineral spirits—a common non-polar solvent used in the preparation of asphalt cutbacks and cold applied adhesives—there is an extreme degree of separation between the bio-oil and the solvent. This can be observed by visual inspection. This same phenomenon occurs when the bio-oil is added to paraffinic wax. Paraffinic wax is a non-polar hydrocarbon that is relatively clear as a liquid such that, when bio-oil is mixed with paraffinic wax, one can readily observe the separation between wax and bio-oil.

Similarly, when the bio-oil is added directly to hot asphalt and thoroughly mixed, it becomes separated on standing. This is shown through the performance of ASTM softening point separation tests. In these tests, a blend of bio-oil and asphalt binder is poured into thin aluminum tubes and maintained at a suitable temperature—typically 150° C. or above—for a period of time sufficient to ensure liquidity of the sample. At the conclusion of the allotted time period, the sample tubes are frozen and cut into three equal pieces, and the top and bottom pieces are tested. If the performance of the softening point test is not equal or at least very close to equal for the top and bottom portions then a separation has occurred in the sample during the high temperature storage phase.

Such separation occurs when the bio-oil is added to petroleum-based asphalt. The separation results from a difference in density and also from a lack of chemical affinity between the bio-oil and the more non-polar asphalt. This is also why the bio-oil is seen to separate upon mixing with mineral spirits or paraffinic wax.

Although not wanting to be bound by any theoretical consideration, is believed likely that the chemical composition of bio-oil is more akin in structure and function to the asphaltene phase of the asphalt and hence not entirely compatible with asphalt given the limitation of the maltenes to incorporate it into the mobile phase. Asphaltenes, which are considered to be the stationary phase of asphalt are defined operationally as that part of asphalt that is soluble in toluene, whereas maltenes, which are considered the mobile or continuous phase, are soluble in n-heptane. As such, any excess quantity of polar bio-oil may thus separate from the asphalt and form a mass of sludge that detracts rather than compliments the activity and function of the asphalt. For this reason, the present invention discloses how to compatibilize the varied organic composition of bio-oil with asphalt so as to maintain a durable homogeneous composition after mixing, processing and employing in its end use (e.g., asphalt binder, inter-ply adhesives, cements, crack fillers, sealants, coatings and adhesives).

In order to successfully employ the bio-oil in asphalt compositions without the aforementioned separation, it is necessary to include at least one compatibilizing agent in the asphalt compositions. Thus, in accordance with the present invention, at least one compatibilizing agent is employed in asphalt compositions including bio-oil as a replacement for a portion of the asphalt. The at least one compatibilize agent serves to overcome the chemical incompatibility between the bio-oil and the petroleum-based asphalt. The at least one compatibilizing agent may be made up of one or more of the compatibilizing agents described herein. The compatibilizing agent or agents will serve to bridge the gap between the polar bio-oil and the non polar asphalt, similar to the formation of micelles in an oil-in-water emulsion, wherein lipophilic ends of a surfactant orient toward the oil and hydrophilic ends of the surfactant orient toward the water phase.

Non-limiting examples of useful compatibilizing agents include hydrocarbon molecules containing amine functionalities, amide functionalities, amidoamine hybrid functionalities, hydroxyl functionalities, ester functionalities and carboxylic acid functionalities. Mixtures of the forgoing may also be employed. Thus the present disclosure notes the use of "at least one" compatibilizing agent.

Particularly useful hydrocarbons with amine functionalities include amines, polyamines, fatty amines, hydrogenated tallow amines and hydrogenated tallow diamines. Suitable hydrogenated tallow amines and hydrogenated tallow diamines are available from a wide variety of suppliers worldwide including CECA S.A. (La Garenne Colombes, France), AkzoNobel (Amsterdam, The Netherlands) and Evonik Goldschmidt (Essen, Germany).

Particularly useful hydrocarbons with amide functionalities include ethylene bis stearamide, coco amide and tallow amide.

Particularly useful hydrocarbons with amidoamine hybrid functionalities include laurylamidopropyldimethylamine, stearylamidopropyldimethylamine, tallowamidopropyldimethylamine and hydrogenated cocoamidopropyldimethylamine.

Particularly useful hydrocarbons with hydroxyl functionalities include glycerin, castor oil, soybean oil and polyvinyl alcohol Particularly useful hydrocarbons with ester functionalities include ethylene glycol phosphate ester.

Particularly useful hydrocarbons with carboxylic acid functionalities include stearic acid, palmitic acid and coco fatty acid.

Other useful compatibilizing agents include polymers that contain both polar and non-polar groups, such as ethylene vinyl acetate, and solvents such as maleated soybean oil and glycerin. Particularly useful compatibilizing agents are the copolymers of ethylene and vinyl acetate, known as EVA's, which serve the dual function of compatibilizing the asphalt and bio-oil while also modifying certain physical properties of an asphalt composition. Many varieties of ethylene vinyl acetate copolymers are available and are distinguished from one another largely in terms of their vinyl acetate content and their melt flow index. These products are available from multiple sources worldwide including DuPont (Wilmington, Del., USA), Arkema (Philadelphia, Pa., USA) and Repsol (Madrid, Spain).

Again, not wanting to be bound in this present invention by theoretical considerations, it is thought that the polar, vinyl acetate moieties of the EVA copolymer, for example, orient with the polar sites of the bio-oil with which it is mostly compatible, while the ethylene portion of the copolymer orients with the mobile or maltenes phase of the asphalt with which it is also compatible. The compatibilizing agent thus associates these two phases by virtue of its lipophilic and lipophobic moieties. With the utilization of the compatibilizing agent or agents it is possible to develop modified asphalt formulations that include a high percentage of bio-oil as a replacement for part of the asphalt that would normally be employed in the asphalt formulation In some embodiments, the at least one compatibilizing agent is added to an asphalt composition including asphalt and bio-oil. In other embodiments, the at least one compatibilizing agent is added to the bio-oil to create a bio-resource resin, as already noted and defined. This bio-resource resin can then be employed as an addition to asphalt compositions. Asphalt compositions are to be understood to be any composition that includes asphalt as a significant component thereof. Non-limiting examples of asphalt compositions in which the present invention finds application include asphalt binders, asphalt mastics, asphalt coatings, asphalt adhesives, and asphalt fillers.

Asphalt compositions in accordance with this invention can include from 20 to 95 percent by weight (wt %) asphalt, from 4.9 to 40 wt % bio-oil and from 0.1 to 40 wt % compatibilizing agents. In one or more embodiments, asphalt compositions can include from 60 to 90 wt % asphalt, from 9 to 30 wt % bio-oil and from 1 to 10 wt % compatibilizing agents.

In other embodiments the asphalt compositions include from 5 to 50 parts bio-oil and from 0.1 to 10 parts compatibilizing agents per 100 parts asphalt. In yet other embodiments the asphalt compositions include from 10 to 50 parts bio-oil and from 1 to 5 parts compatibilizing agents per 100 parts asphalt, in other embodiments, from 10 to 25 parts bio-oil and from 2 to 4 parts compatibilizing agent per 100 parts asphalt.

In other embodiments, the asphalt compositions include at least 5 parts bio-oil per 100 parts asphalt, in other embodiments at least 7 part bio-oil, in other embodiments, at least 10 parts bio-oil, in other embodiments at least 15 parts bio-oil, in other embodiments, at least 20 parts bio-oil and in other embodiments at least 25 parts bio-oil per 100 parts asphalt. In other embodiments, the asphalt compositions include less than 100 parts bio-oil per 100 parts asphalt, in other embodiments less than 75 part bio-oil, in other embodiments, less than 67 parts bio-oil, in other embodiments less than 50 parts bio-oil, in other embodiments, less than 40 parts bio-oil and in other embodiments less than 34 parts bio-oil per 100 parts asphalt.

In other embodiments, the asphalt compositions include at least 0.1 parts compatibilizing agents per 100 parts asphalt, in other embodiments at least 0.2 part compatibilizing agents, in other embodiments, at least 0.5 parts compatibilizing agents, in other embodiments at least 1 part compatibilizing agents, in other embodiments, at least 2 parts compatibilizing agents and in other embodiments at least 3 parts compatibilizing agents per 100 parts asphalt. In other embodiments, the asphalt compositions include less than 10 parts compatibilizing agents per 100 parts asphalt, in other embodiments less than 7.5 part compatibilizing agents, in other embodiments, less than 6 parts compatibilizing agents, in other embodiments less than 5 parts compatibilizing agents, and in other embodiments, less than 4 parts compatibilizing agents per 100 parts asphalt.

It will be appreciated that the present invention provides a means for substituting a portion of the asphalt in common asphalt compositions with bio-oil, teaching the compatibilizing of the bio-oil with the asphalt through the use of compatibilizing agents. With this understanding, it will be appreciated that asphalt compositions can be produced as in the prior art though with a portion of the asphalt substituted with bio-oil. Thus common asphalt additions can be used in the same manner and same amounts as common in the art. For example, and without limitation, asphalt compositions in accordance with this invention may include common additives such as fibers, fiber-dispersing surfactants, limestone, clay, clay-activating surfactants, diatomaceous earth, talc, mica, and mixtures of the forgoing. Again, such additives would be employed in common amounts.

In some embodiments, the compatibilizing agents and the bio-oil are mixed to create a stand-alone product that is termed herein a "bio-resource resin." In the bio-resource resin, the compatibilizing agent may be present in an amount of from 0.1% to 50% percent by weight (wt %), in other embodiments, from 0.5 to 20 wt %, and in other embodiments, 1 to 10 wt %. This bio-resource resin premix may be employed as a replacement for a portion of petroleum-based asphalt. In some embodiments, the bio-resource resin may replace from 1 to 50% of the petroleum-based asphalt, in other embodiments, from 5 to 25%, in other embodiments, 10 to 20%. A useful bio-resource resin additive for application in asphalt products may include from 50% to 99% of the bio-oil and from 1% to 50% of the compatibilizing agents in order to achieve the desired or necessary properties.

In other embodiments, the bio-resource resin includes from 0.1 to 50 parts compatibilizing agent per 100 parts bio-oil. In other embodiments, the bio-resource resing includes from 0.2 to 25 parts compatibilizing agent per 100 parts asphalt, in other embodiments, from 0.5 to 15, in other embodiments, from 1 to 10, in other embodiments, from 2 to 7.5, and in other embodiments, from 2 to 5 parts compatibilizing agent per 100 parts asphalt.

In other embodiments, the bio-resource resin include at least 0.1 parts compatibilizing agents per 100 parts bio-oil, in other embodiments at least 0.2 part compatibilizing agents, in other embodiments, at least 0.5 parts compatibilizing agents, in other embodiments at least 1 part compatibilizing agents, in other embodiments, at least 2 parts compatibilizing agents and in other embodiments at least 3 parts compatibilizing agents per 100 parts bio-oil. In other embodiments, the bio-resource resin include less than 25 parts compatibilizing agents per 100 parts bio-oil, in other embodiments less than 20 part compatibilizing agents, in other embodiments, less than 15 parts compatibilizing agents, in other embodiments less than 10 parts compatibilizing agents, in other embodiments, less than 7.5 parts compatibilizing agents per 100 parts bio-oil, and in other embodiments, less than 5 parts compatibilizing agents per 100 parts bio-oil.

In other embodiments, it has been found desirable to further include block copolymers of styrene and butadiene (SBS) in the asphalt compositions employing the bio-resource resin. In the case of SBS, the polystyrene blocks of the tri-block polymer are more preferentially oriented toward the polar moieties of the bio-resource resin and also to the asphaltene phase of asphalt, whereas the polybutadiene block of the SBS orients preferentially toward the mobile maltenes phase of the asphalt thereby creating a more durable suspension vs. the bio-resin and asphalt alone. In the case of SBS and EVA as well as other compatibilizing copolymers comprised of both polar and non-polar moieties, the polymer can be first dispersed into the bio-resource resin and then added to the asphalt. By pre-dispersing the polymer, particularly in the case of SBS, the bio-resource resin acts as an aid to dispersing the polymer into the asphalt. Normally SBS requires significantly high sheer and temperature levels in order to become incorporated into the asphalt, whereas, in the case of being compounded with the bio-resource resin, it is much more readily dispersed and solvated. SBS is available from a variety of suppliers worldwide including ChiMei Corporation (Taiwan), Dynasol Elastomers (Mexico) and Kraton Polymers (USA) in linear, radial, star and di-block geometries.

When block copolymers of styrene and butadiene are employed in asphalt compositions in accordance with this invention, the asphalt compositions can include from 20 to 95 percent by weight (wt %) asphalt, from 4.9 to 40 wt % bio-oil, from 0.1 to 40 wt % compatibilizing agents and from 0.5 to 15 wt % of such block copolymers. In one or more embodiments, asphalt compositions can include from 60 to 90 wt % asphalt, from 9 to 30 wt % bio-oil, from 1 to 10 wt % compatibilizing agents and from 1 to 10 wt % of such block copolymers, in other embodiments from 2 to 10 wt %, in other embodiments, from 2 to 7.5 wt %, and in other embodiments, from 2 to 5 wt %.

In other embodiments, the asphalt compositions can include at least 0.5 parts SBS block copolymers per 100 parts asphalt, in other embodiments at least 1 part SBS block copolymers, in other embodiments, at least 2 parts SBS block copolymers, in other embodiments at least 4 part SBS block copolymers, in other embodiments, at least 5 parts SBS block copolymers and in other embodiments at least 10 parts SBS block copolymers per 100 parts asphalt. In other embodiments, the bio-resource resin include less than 20 parts SBS block copolymers per 100 parts asphalt, in other embodiments less than 15 part SBS block copolymers, and in other embodiments, less than 10 parts SBS block copolymers per 100 parts asphalt.

It will be appreciated that other additions, such as fibers (typically added for reinforcement), clays, and inert fillers such as limestone, diatomaceous earth, talc, mica and mixtures thereof can be employed in asphalt compositions of this invention, and used in typical amounts. Indeed, the present invention discloses how to better compatibilize bio-oil with asphalt, and after substituting a portion of the asphalt with bio-oil, common asphalt compositions can be created using common additives in common amounts.

During the production of asphalt paving binder compositions, bio-oil would be transported from the energy conversion process unit to an asphalt terminal equipped with heated mix tanks and a colloid mill or other similar high shear mixer. The bio-oil would be heated to a temperature of between 100 and 200° C. in some cases, between 120 and 180° C. in other instances, and between 140 and 160° C. in other instances, after which between 0.1 and 50 percent by weight of a compatibilizing agent as taught herein would be added to the mix tank and thoroughly blended for between 5 and 30 minutes to create a bio-resource resin. At this point it would be possible to add between 2 and 4 wt % of a copolymer of styrene and butadiene or another amount necessary to satisfy the requirements of the intended use of the asphalt binder. Alternatively, the same amount of SBS could first be added to the asphalt. In either case, the hot bio-resource resin composition would be added to the asphalt and well dispersed by mixing. Thereafter the mixture would be passed through a high speed colloid mill designed to integrate the polymer with the asphalt to create what is known in the art as a phase inverted polymer modified asphalt composition, which would be tested for performance requirements according to its intended use (for example, under the Strategic Highway Research Program (SHRP) standards) and then transported to the asphalt cement plant where it would be used in the production of asphalt paving cement.

In the case of producing a fibrated asphalt roof cement the bio-oil would be heated to 80° C. and then premixed with between 0.1 and 25 percent of the compatibilizing agent to provide a bio-resource resin that can be added at between 5 and 20 percent to a low shear mix tank containing warm (60 to 80° C.) asphalt cutback having a composition of between 70 and 80 percent asphalt and between 20 and 30 percent hydrocarbon solvent such as odorless mineral spirits. The asphalt cutback and bio-resource resin mixture is blended for between 15 and 30 minutes after which time it is loaded with between 5 and 30 percent mineral fillers such as attapulgite clay (such as Attagel 36, BASF) and limestone and then with between 3 and 6 percent cellulose fibers (such as Gel-Cell 10, J.R. Rettenmaier) thereby completing the batch with further mixing as required to achieve a viscous, homogeneous mixture. In some cases it may be necessary to separately add specifically intended chemicals such as Fentacare OPA-10 Acetate sold by Momentum Technologies, Inc. as necessary to promote the gelation of the Attapulgite clay.

If the copolymer (styrene and butadiene) additions are employed they will most likely be used in accordance with final physical property requirements of the asphalt product being produced. In the case of asphalt paving binders the total loading of copolymer into the asphalt would preferable be between 1% and 8% by weight and most preferable between 2 and 4 percent by weight, and this amount could be premixed into the bio-resource resin, the asphalt or to the blend thereof. In the case of asphalt roofing membranes the total loading of SBS into the asphalt product would preferably be between 2 and 15 percent and most preferable between 8 and 12 percent and could be premixed into the bio-resource resin, the asphalt or to the blend thereof.

In some cases it may be necessary to extract desired components from the bio-oil. In some such cases physical separation techniques such as filtration and centrifugation are appropriate, particularly where inorganic compounds remain present in the form of char. In other cases chemical separation techniques in the form of liquid extractions may be required.

Non limiting examples of separation techniques and methods include first dissolving the bio-resource resin with a polar organic solvent followed by filtration, liquid separation of insolubles by density and then removal of the solvent from the bio-oil by distillation. Particularly useful solvents for extraction and purification purposes include acetone, dimethy carbonate and diethyl ether. The solvent insoluble fraction may be further isolated for use in more appropriate applications.

A further necessary manipulation of the bio-resource resin in certain applications where inorganic components of the resin, often referred to as char, may be problematic would involve the physical separation of impurities by way of fine mesh screening or filtration. Certain of these impurities can be removed simply by screening and others by a flocculation process whereby chemical additives, such as aluminum sulfate, are combined with the resin thereby forming precipitants with the inorganic components that cannot be removed in the primary screening. Since these secondary processes impart a margin of cost that is above and beyond that incurred in the original hydrothermal process the resultant purified products may be best suited to higher price point materials such as adhesives and sealants instead of asphalt binders, mastics and coatings.

EXAMPLES

Example 1

90 grams (90 parts) of asphalt with a performance grading of 64-28 was added to a stainless steel beaker and heated to a temperature of 325° F. under mild stirring. To this was added 10 grams (10 parts) of bio-oil (Innoventor, St. Louis, Mo.) followed by further mixing for 30 minutes while maintaining a temperature of 350° F. This formed a control for comparison against asphalt compositions including compatibilizing agents for the bio-oil as in accordance with this invention. For comparison, a first formulation was formed according to the same formulation of asphalt (90 parts) and bio-oil (10 parts) but with the inclusion of 1 part hydrogenated tallow amine (HTA) (i.e., compatibilizing agent), the compatibilizing agent being added at the same time as the addition of the bio-oil. For additional comparison, a second test formulation was formed according to the same formulation of asphalt (90 parts) and bio-oil (10 parts) but with 1 part hydrogenated tallow amine (compatibilizing agent) and 3 ethylene-vinyl acetate (compatibilizing agent). When subjected to testing by softening point separation ASTM D7173-11 the following results were determined and are provided in the following table.

| Formula | Bottom (° C.) | Top (° C.) | Difference (° C.) |
|---|---|---|---|
| Asphalt + Bio Oil | 115 | 126 | 11 |
| Asphalt + Bio Oil + HTA | 121 | 128 | 7 |
| Asphalt + Bio Oil + HTA + EVA | 130 | 136 | 6 |

It is readily seen that the inclusion of the compatibilizing agent results in better performance under the ASTM test as the softening points of the top and bottom layers are much closer in the test formulas than in the control.

Example 2

250 grams of 70/30 asphalt cutback in odorless mineral spirits is preheated to 140° F. and placed into a 2-liter stainless steel mixing bowl from a Hobart planetary gear mixer. To this is added 5 grams of hydrogenated tallow amine (Noram SH, CECA, SA) while stirring at setting #2 for 5 minutes. To this is added 25 grams of bio-oil while maintaining original temperature. When the bio-oil is completely dispersed, 3.75 grams of OPA-10 Acetate surfactant (Momentum Technologies, Inc.), a clay gel activator (noting that it may also serve as a compatibilizing agent along with HTA), is added followed by an additional 5 minutes of mixing. To this is added 30 grams of Attagel 36 (BASF Corporation) followed by 10 minutes of mixing during which time a thixotropic gel structure will have formed. To this is added 15 grams of cellulose fibers (J.R. Rettenmaier, Gel-Cell 10) with continued mixing at a setting of #1 for 5 minutes. To this is added 30 grams of finely ground calcium carbonate followed by 5 minutes of mixing thereby completing the batch. The resultant composition is an example of asphalt based fibrated roof cement Example 3

250 grams of 70/30 asphalt cutback in odorless mineral spirits is preheated to 140° F. and placed into a 2-liter stainless steel mixing bowl from a Hobart planetary gear mixer. To this is added 5 grams of Noram SH (HTA, compatibilizing agent) while stirring at setting #2 for 5 minutes. To this is added 25 grams of bio-oil while maintaining original temperature. When the bio-oil is completely dispersed 5 grams of OPA-10 Acetate is added followed by 5 minutes of mixing. To this is added 20 grams of Attagel 36 followed by about 10 minutes of mixing at setting #2. To this is added 40 grams of finely ground calcium carbonate followed by an additional 5 minutes of mixing. The resultant composition is an example of an asphalt roof coating adhesive.

Example 4

100 grams of bio-resource resin (90 parts bio-oil (Innoventor)) and 10 parts HTA) is heated to 300° F. in a 150 mL glass beaker. To this is added 24 grams of PB-5302 linear SBS block copolymer (Chi Mei Corporation) with good mixing over 10 minutes using high shear mixing. This composition is representative of a polymer modification of the object of this invention.

Example 5

250 grams of 70/30 asphalt cutback in odorless mineral spirits is preheated to 140° F. and placed into a 2-liter stainless steel mixing bowl from a Hobart planetary gear mixer. To this is added 5 grams of Noram SH while stirring at setting #2 for 5 minutes. To this is added 35 grams of the bio-resource resin of Example 4 with good mixing at setting #2 of the Hobart mixer. When the bio-oil is completely dispersed, 3.75 grams of OPA-10 Acetate surfactant (Momentum Technologies, Inc.) is added followed by an additional 5 minutes of mixing. To this is added 30 grams of Attagel 36 (BASF Corporation) followed by 10 minutes of mixing during which time a thixotropic gel structure will have formed. To this is added 15 grams of cellulose fibers (J.R. Rettenmaier, Gel-Cell) with continued mixing at a setting of #1 for 5 minutes. To this is added 30 grams of finely ground calcium carbonate followed by 5 minutes of mixing thereby completing the batch. The resultant composition is an example of polymer modified asphalt based fibrated roof cement.

Example 6

2000 grams of bio-resource resin (1800 parts bio-oil and 200 parts HTA) of the present invention is added to a 4 liter mixing vessel equipped with a high shear roter-stator mixer (Silverson) and heated to 300° F. To this is added 1000 grams of PB-511 radial SBS (Chi Mei Corporation) with a radial geometric structure under constant heat and high shear mixing for 15 minutes or until the polymer is completely dispersed. The resultant product is a readily dispersible polymer additive for use in asphalt based roofing products.

Example 7

500 grams of bio-resource resin of the present invention is added to a 2 liter, 3 neck, round bottom flask placed upon a heating mantle and equipped with a paddle mixer a reflux column and an addition flask. To the addition flask is added approximately 500 mL of industrial grade acetone which is gradually added to the bio-resin while stirring as heat is applied to the flask from the mantle. The contents of the flask are refluxed for a period of about 2 hours during which time the acetone soluble fractions of the bio-resin are removed from the insoluble fraction. The acetone soluble fraction is separated from the insoluble fraction of the bio-resin using a separatory funnel and isolated for distillation to remove the solvent from the non-volatiles. The non-volatile remainder of the acetone soluble fraction constitutes an example of the polar organic fraction of the bio-oil. Extracting the acetone soluble fraction may be found desirable when the end product of manufacturing requires a more narrow spread of chemical components contained within the bio-oil.

It can be seen that the present invention improves and even optimizes the effectiveness of bio-oil employed in asphalt applications. By sourcing the bio-oil from livestock waste and compatibilizing it for use in petroleum asphalt, livestock waste is better disposed of, reducing the amount of animal waste on farms where it can be a serious health and environmental hazard. Also, less demand is placed upon asphalt supplies, allowing for the increased utilization of asphalt based products in various industries. Using bio-oil reduces the amount of petroleum asphalt required for its traditional uses such as in adhesives, cements, rolled asphalt goods and roofing shingles, thereby allowing petroleum to be used in more lucrative end products such as fuels and petrochemicals. Further improvements are realized in particular embodiments wherein the bio-oil exhibits solubilizing effects on various polymers (e.g., styrene-butadiene-styrene and styrene-ethylene-butadiene-styrene) to facilitate the incorporation of those polymers into petroleum asphalt.

What is claimed is:

1. A bio-resource resin for use as a replacement for a portion of asphalt in asphalt compositions, the bio-resource resin comprising a non-reacted blend of:
   a. a bio-oil derived from animal waste and including hydrocarbons; and
   b. a separate and distinct compatibilizing agent that serves to improve the chemical compatibility between the bio-oil and asphalt.

2. The bio-resource resin of claim 1, wherein the bio-oil is derived from animal waste by subjecting the animal waste to a conversion process selected from the group consisting of a hydrothermal conversion process and a thermochemical conversion process.

3. The bio-resource resin of claim 2, wherein the animal waste is processed at a temperature of from 100 to 400° C.

4. The bio-resource resin of claim 3, wherein the animal waste is processed at a pressure of greater than 200 psi.

5. The bio-resource resin of claim 4, wherein the animal waste is processed in the absence of oxygen.

6. The bio-resource resin of claim 2, wherein the animal waste is processed at a pressure for from 1600 psi to 1800 psi and a temperature of from 250 to 350° C.

7. The bio-resource resin of claim 2, wherein, prior to being subjected to a conversion process, the animal waste is processed to form a slurry having less than 30% solids content.

8. The bio-resource resin of claim 2, wherein the compatibilizing agent is selected from the group consisting of hydrocarbon molecules containing amine functionalities, hydrocarbon molecules containing amide functionalities, hydrocarbon molecules containing amidoamine hybrid functionalities, hydrocarbon molecules containing hydroxyl functionalities, hydrocarbon molecules containing ester functionalities, hydrocarbon molecules containing carboxylic acid functionalities, copolymers of ethylene and vinyl acetate, maleated soybean oil, glycerin and mixtures of the forgoing.

9. The bio-resource resin of claim 8, wherein the bio-resource resin includes from 0.1 to 50 parts compatibilizing agent per 100 parts bio-oil.

10. The bio-resource resin of claim 8, wherein the bio-resource resin includes from 1 to 10 parts compatibilizing agent per 100 parts bio-oil.

11. An asphalt composition comprising:
    asphalt;
    bio-oil derived from animal waste and including hydrocarbons; and
    a separate and distinct compatibilizing agent improving the chemical compatibility between the bio-oil and the asphalt.

12. The asphalt composition of claim 11, wherein the bio-oil is derived from animal waste by subjecting the animal waste to a conversion process selected from the group consisting of a hydrothermal conversion process and a thermochemical conversion process.

13. The asphalt composition of claim 12, wherein the animal waste is processed at a temperature of from 100 to 400° C.

14. The asphalt composition of claim 13, wherein the animal waste is processed at a pressure of greater than 200 psi.

15. The asphalt composition of claim 14, wherein the animal waste is processed in the absence of oxygen.

16. The asphalt composition of claim 12, wherein the compatibilizing agent is selected from the group consisting of hydrocarbon molecules containing amine functionalities, hydrocarbon molecules containing amide functionalities, hydrocarbon molecules containing amidoamine hybrid functionalities, hydrocarbon molecules containing hydroxyl functionalities, hydrocarbon molecules containing ester functionalities, hydrocarbon molecules containing carboxylic acid functionalities and mixtures of the forgoing hydrocarbons.

17. The asphalt composition of claim 16, wherein the asphalt composition includes from 20 to 95 percent by weight (wt %) asphalt, from 4.9 to 40 wt % bio-oil and from 0.1 to 40 wt % compatibilizing agents.

18. The asphalt composition of claim 16, wherein the asphalt composition includes at least 5 parts bio-oil per 100 parts asphalt and at least 0.1 parts compatibilizing agents per 100 parts asphalt.

19. The asphalt composition of claim 18, wherein the asphalt composition further includes 0.5 parts SBS block copolymer per 100 parts asphalt.

20. The asphalt composition of claim 18, further including at least one additive selected from the group consisting of fibers, fiber-dispersing surfactants, limestone, clay, clay-activating surfactants, diatomaceous earth, talc, and mica.

* * * * *